2,727,885

PROCESS FOR PRODUCING TALL OIL ALCOHOL

Alfred N. Hoffmann, Wilmington Manor, and James B. Montgomery, Glenberne Estates, Del., assignors to Hercules Powder Company, Wilmington, Del., a corporation of Delaware No Drawing. Application October 24, 1951, Serial No. 253,013

7 Claims. (Cl. 260—97.5)

This invention relates to the preparation of tall oil alcohols, and, more particularly, to the preparation of tall oil alcohols by a two-stage hydrogenation of tall oil.

The conversion of tall oil acids or esters to the corresponding alcohols is known to the art. However, the primary concern has been to hydrogenate the fatty acid portion to a mixture of oleic and stearic or to stearic acid completely in the presence of a nickel catalyst. Tall oil, in general, is difficult to hydrogenolyze to the alcohol by methods commonly used in processing vegetable oils or fatty acids. Addition of hydrogen under pressure may cause, in addition to hydrogenolysis, rearrangement and displacement of the original hydrogens or dehydrogenation under the conditions of treatment. This difficulty in attempted hydrogenolyses has been attributed to the presence of sulfur compounds or other catalytic poisons in the tall oil. Yields of alcohol from hydrogenolysis of tall oil consequently are low while consumption of catalyst is high.

It has now been discovered that a preliminary treatment comprising a pressure hydrogenation over a hydrogenation catalyst circumvents these difficulties. During this preliminary procedure the catalyst poisons, as such, are removed and a substantial amount of reduction of the double bonds occurs. The spent catalyst is then removed and the tall oil subjected to a high pressure catalytic hydrogenolysis. The process gives a highly saturated mixture of fatty and resin alcohols in high yields under practical conditions while consumption of hydrogenolysis catalyst is low. This process, therefore, presents a practical method for the hydrogenolysis of tall oil acids to the saturated alcohols.

The terms "hydrogenation" and "hydrogenolysis" as used herein refer to specific and distinct processes. By "hydrogenation" is meant the addition of hydrogen to an ethylenically unsaturated carbon-carbon bond while by "hydrogenolysis" is meant the addition of hydrogen to the carboxy group of an acid or the ester group of an ester whereby the carboxy or ester group is converted to an alcohol.

Having described the general aspects of this invention, the following examples are given as specific embodiments. These examples are not, however, to be construed as limiting the invention. All parts and percentages are by weight unless otherwise specified.

Example 1

A nickel-lined stainless steel stirring autoclave was charged with 1800 parts distilled tall oil having an acid number of 183, a saponification number of 183 and a percent hydrogen absorption value of 1.27. One hundred eighty parts Raney nickel catalyst under methyl cyclohexane solvent was added to the reactor. After flushing with nitrogen to remove the air and testing for leaks, the bomb was pressured to 50 p. s. i. hydrogen at 27° C. and the heat and agitation turned on. The mass was heated to 200° C., which temperature was maintained for 2 hours. The hydrogen pressure was kept between 30 and 85 p. s. i. during this time. After cooling, the product was removed and filtered.

Nine hundred parts of the above product was recharged into the same nickel-lined autoclave together with 135 parts of powdered copper chromite catalyst. After flushing with nitrogen and testing with hydrogen, the autoclave was pressured to 3500 p. s. i. hydrogen at 25° C. Heat and agitation were turned on and the mass heated to 264° C. At this temperature the pressure was raised from 3200 to 5200 p. s. i. The reaction was continued at 260° C. for 5 hours, the pressure being maintained between 4800 and 5200 p. s. i. After cooling, the product was removed and filtered. The following analysis shows that conversion to the alcohol was complete and that the product was approximately 90% saturated with hydrogen.

Following is the analysis of the product:

Percent hydrogen absorption_____ 0.14, 0.14.
Acid number_____ 0.6, 0.7.
Saponification number_____ 3.8, 4.4.
Percent hydroxyl_____ 5.56, 5.54.

Example 2

A stainless steel stirring autoclave was charged with 1500 parts of distilled methyl ester of crude tall oil having an acid number of 1.0, a saponification number of 177, a hydrogen absorption value of 1.30%, and a hydroxyl value of 0.11%. One hundred fifty parts of powdered copper chromite catalyst was added to the reactor. After a nitrogen flush to remove the air and a pressure test for leaks, the reactor vessel was pressured to 3500 p. s. i. and the heat and agitation turned on. The temperature was raised to 260° C. in 1¼ hours. The pressure was increased from 3000 to 5200 p. s. i. and the run continued at 260° C. between 4800 and 5200 p. s. i. for 10¾ hours. The autoclave was cooled and the product removed and filtered. The analysis on this material is as follows:

Percent hydrogen absorption_____ 0.67, 0.67.
Saponification number_____ 171.5, 176.5.
Percent hydroxyl_____ 0.23, 0.13.
Acid number _____ 17.3, 16.8.

One thousand two hundred eighty-eight parts of the above product was recharged into the stainless steel autoclave together with 130 parts of fresh powdered copper chromite catalyst. After flushing and testing, the autoclave was pressured to 3500 p. s. i. hydrogen at 45° C. Heat and agitation were turned on and the mass heated to 260° C. over a period of one hour. The pressure was raised from 4825 to 5200 at 260° C. and the run continued at 260° C. between 4800 and 5200 p. s. i. for 9½ hours. After cooling, the product was removed and filtered. The analyses of the product indicated complete conversion to the alcohol and approximately 75% saturation with hydrogen. The analytical data are as follows:

Percent hydrogen absorption_____ 0.32, 0.31.
Saponification number_____ Nil.
Percent hydroxyl_____ 5.77, 5.76.
Acid number_____ 0.7.

Example 3

A stainless steel stirring autoclave was charged with 12,114 parts of distilled tall oil having an acid number and a saponification number of 183 and a per cent hydrogen absorption value of 1.27. Seven hundred parts of Raney nickel catalyst under methyl cyclohexane solvent was added to the reactor. After flushing with nitrogen to remove the air and testing for leaks, the autoclave was pressured to 150 p. s. i. hydrogen at 44° C.

and the heat and agitation turned on. The mass was heated to 200° C., which temperature was maintained for 2 hours. The hydrogen pressure was kept between 150 and 250 p. s. i. during this time. After cooling, the product, having an acid number of 170, a per cent hydrogen absorption value of 1.13, and a saponification number in the 220–230 range, was removed and filtered.

Fourteen hundred parts of the above material was charged into the stainless steel stirring autoclave together with 140 parts of powdered copper chromite catalyst. After flushing with nitrogen and testing for leaks, the autoclave was pressured to 2100 p. s. i. at 53° C. and the heat and agitation turned on. The temperature was raised to 260° C. in 49 minutes. The pressure which had dropped to 900 p. s. i. was raised 2100 p. s. i. The run was continued at 260° C., maintaining the pressure between 1800 and 2100 p. s. i. for 8½ hours. After cooling, the product was removed and filtered. The analysis of the product indicated approximately 75% conversion to the alcohol and approximately 93% saturation with hydrogen. The analytical data are as follows:

Per cent hydrogen absorption _____ 0.08, 0.10.
Saponification number _____ 31.
Per cent hydroxyl _____ 4.06, 4.28.
Acid number _____ 1.2.

Example 4

A stainless steel stirring autoclave was charged with 12,201 parts of methyl ester of tall oil having an acid number of 1, a saponification number of 175 and a per cent hydrogen absorption value of 1.19. Seven hundred ninety-eight parts of Raney nickel under methyl cyclohexane was added to the reactor. After a nitrogen flush to remove the air and a pressure test for leaks, the reactor vessel was pressured to 150 p. s. i. hydrogen at 35° C. and the heat and agitation turned on. The temperature was raised to 200° C. in 2 hours and 7 minutes and the prehydrogenation continued at 200° C. between 100 and 250 p. s. i. for 2 hours. The autoclave was cooled and the product removed and filtered. The acid number was 0.7.

Nine thousand seven hundred eighty-six parts of the above material was recharged into the stainless steel autoclave together with 500 parts of powdered copper chromite catalyst. After flushing with nitrogen and testing, the autoclave was pressured to 3500 p. s. i. hydrogen at 27° C. and the heat and agitation turned on. The temperature was raised to 260° C. in 3 hours and 6 minutes. The pressure was raised from 3500 to 5200 p. s. i. and the run continued at 260° C. between 4800 and 5200 p. s. i. for 9¼ hours. After cooling, the product was removed and filtered. The analyses of the product indicated complete conversion to the alcohol and approximately 70% saturation with hydrogen. The analytical data are as follows:

Per cent hydrogen absorption _____ 0.38, 0.37.
Saponification number _____ 10.2, 10.3, 12.6.
Per cent hydroxyl _____ 5.96, 5.99.
Acid number _____ Nil.

The copper chromite catalyst used in the examples was prepared by mixing equimolar portions of ammonium bichromate and copper carbonate in the presence of enough ammonium hydroxide to give a pH of 7 to 8 and then igniting the resulting copper ammonium chromate, extracting it three times with dilute acetic acid, washing it six times with water, and calcining it at 400° C.

The catalyst used in the hydrogenation step may be composed of one or more metals or metal oxides prepared in an active form and selected from the group known as the hydrogenating metals or metal oxides. Suitable catalytic substances are, for example, the metals: nickel, cobalt, iron, platinum, palladium, silver, tin, lead, copper, cadmium, zinc, etc. Oxides of the aforesaid metals may be used. Other active oxides may also be used. These catalysts may be used either alone, in admixture, or with activators. Suitable activators may be chosen from compounds of the solid metallic elements of the first to seventh groups of the periodic system, especially oxygen-containing compounds. Thus, the oxides or carbonates of the alkali or alkaline earth or rare earth metals may be used, and also the salts formed by a hydrogenating metal with a metal acid, as, for example, the chromates, tungstates, vanadates, manganates, molybdates, uranates, and titanates. Detailed lists of hydrogenation catalysts and activators together with their preparation are given in the literature. Of interest are U. S. 1,746,781; U. S. 2,077,421; U. S. 2,079,414; U. S. 2,091,800; U. S. 2,110,483; U. S. 2,118,001; U. S. 2,241,416; U. S. 2,241,417; U. S. 2,322,095; U. S. 2,322,096; U. S. 2,322,097; U. S. 2,322,098; U. S. 2,322,099; U. S. 2,358,234; U. S. 2,358,235; U. S. 2,392,952; etc. For the hydrogenation catalyst, it is preferred to use one of the iron group metals, i. e., iron, nickel, or cobalt, or one of the hydrogenating metals in chemical combination with an oxide of chromium, as, for instance, copper chromite. The platinum group metals are very efficient in this process but are not preferred by reason of their cost.

Any of the hydrogenation catalysts known to the prior art to be effective for hydrogenolysis may be used in the hydrogenolysis step. Certain very energetic catalysts such as metallic platinum and palladium are known to carry the hydrogenolysis too far with the formation of hydrocarbons rather than the desired alcohol. With the exceptions of these very active catalysts, those catalysts and activators listed above as hydrogenation catalysts may also be used as hydrogenolysis catalysts. Thus, although other highly active hydrogenation catalysts such as metallic cobalt, nickel, and iron lead to some hydrocarbon formation, they may still be used as hydrogenolysis catalysts as shown by U. S. 2,322,095. However, for the hydrogenolysis step it is preferred to use a chromite catalyst. A chromite catalyst consists of one of the hydrogenating metals in chemical combination with an oxide of trivalent chromium, e. g., copper chromite, zinc chromite, nickel chromite, manganese chromite, etc. These chromite catalysts may be used either alone or in any combination with other hydrogenolysis catalysts and either with or without an activator. The preparation and modification of chromite catalysts are well known to those skilled in the art. Modification as used herein indicates any method of varying the activity of the catalyst, as by inclusion of an activator, a variation in the method of manufacture, or by a change in the physical form of the catalyst as used. Patents of interest relative to the preparation of a hydrogenolysis catalyst are U. S. 1,964,000; U. S. 1,746,-782; U. S. 1,746,783; U. S. 2,105,664; and the patents listed above with reference to the hydrogenation step. As used herein "chromite catalyst" means any chemical compound of a hydrogenation metal with a trivalent chromium oxide or any combination thereof or modification thereof, as by the inclusion of an activator therewith, known to those skilled in the art as a hydrogenolysis catalyst.

It is most preferred to use a copper chromite catalyst. Copper chromite catalysts may be modified in a variety of ways as by the inclusion of a chromate or chromite of barium, cadmium, zinc, etc.; by adding an oxide or carbonate of an alkali metal or of an alkaline earth metal; by adding metallic iron; etc. These and other modifications of a copper chromite hydrogenolysis catalyst are known to those skilled in the art and are all included in the term "copper chromite catalyst." Of interest in this respect are U. S. 2,079,414; U. S. 2,091,800; U. S. 2,105,-664; U. S. 2,110,483; U. S. 2,358,234; and U. S. 2,358,235.

Any temperature known to the prior art to effect the hydrogenation of tall oil may be used for the hydrogenation step. It is preferred to carry out the reaction at a temperature of at least about 120° C., and it is most preferred to use a temperature of about 200° C. In any case the upper limit would be that temperature at which excessive degradation occurs which is about 300° C. Any pressure known to the art to effect the hydrogenation of tall oil may be used for the hydrogenation step. The preferred range, however, is 100 to 200 p. s. i. when a catalyst of the iron subgroup is used. Substantially higher pressures are needed when a chromite catalyst is used.

The hydrogenation step is continued until the tall oil is at least about 10% saturated with hydrogen. In order to obtain as high a saturation of the final product as possible, it is preferred to carry the preliminary hydrogenation step as far as is practicable. This is accomplished by continuing the hydrogenation step until there is no longer any appreciable absorption of hydrogen by the material being treated under the conditions used for the hydrogenation.

"Per cent saturation with hydrogen" as applied to any particular sample of hydrogenated tall oil means $$\frac{100\% \times \text{No. of g. of } H_2 \text{ absorbed per 100 g. of the initial tall oil in preparing the sample}}{\text{No of g. of } H_2 \text{ absorbed per 100 g. of the initial tall oil in preparing a completely saturated tall oil}}$$

A "completely saturated tall oil" is one prepared under such strenuous conditions of hydrogenation that substantially all of the ethylenic double bonds contained in the starting tall oil are saturated with hydrogen. The analytical procedure used to effect complete saturation of tall oil is described in detail infra.

Any temperature known to effect the hydrogenolysis of tall oil may be used. When a copper chromite catalyst is used, it is preferred that the hydrogenolysis be carried out at at least about 200° C. It is most preferred to use a temperature of about 260° C. when a copper chromite catalyst is used. The upper temperature limit is confined only to that temperature at which excessive degradation occurs, which is about 350° C. The exact temperature of the reaction will depend on the pressure and the nature of the catalyst system used.

Any pressure known to effect the hydrogenolysis of tall oil may be used. The preferred pressure from a rate-cost consideration is the range 4500 to 6000 p. s. i.

The feedstock for this process is a crude tall oil or a crude tall oil which has either been refined as by distillation or esterified with a lower aliphatic alcohol containing up to five carbon atoms such as methanol, ethanol, isopropanol, etc. and then refined as by distillation. The crude ester obtained by esterifying crude tall oil with a lower aliphatic alcohol containing up to five carbon atoms may also be used. It is preferred to use a refined tall oil. It is most preferred to use the distilled methyl ester of tall oil.

Prior art hydrogenolysis processes produced low yields of tall oil alcohol with a very high consumption of hydrogenolysis catalyst. Moreover, the tall oil alcohol produced retained a relatively large amount of unsaturation. The hydrogenation step of this invention enables partial hydrogenation to proceed concurrently with the cleaning process. One the hydrogenation of the tall oil has been effected, the product may be hydrogenolyzed with ease. The result is that a highly saturated mixture of fatty and resin alcohols can be produced under practical conditions and in very high yield with a very low hydrogenolysis catalyst consumption.

The mixed tall oil alcohols may be used as such in the preparation of sulfonated detergents or may be separated into their valuable component alcohols.

The analytical method referred to supra for quantitatively completely hydrogenating a tall oil is the following. This method effects removal of all unsaturation of the tall oil existing due to the presence of carbon-carbon double bonds and aromatic nuclei.

The method consists of reducing a suspension of platinum oxide in acetic acid to platinum black in an atmosphere of hydrogen, adding a weighed sample of the tall oil to the catalyst suspension and measuring the amount of hydrogen absorbed by the tall oil.

The reagents employed are (1) acetic acid, empyreuma-free (passing dichromate test), (2) platinum oxide catalysts of the type described by Voorhees and Adams, J. A. C. S., 44, 1397 (1922) and by Adams and Shriner, J. A. C. S., 45, 2171 (1923), and (3) commercial hydrogen.

The apparatus employed included a gas measuring buret, a reaction flask, and a magnetic stirrer. The gas buret employed is that described by C. R. Noller and M. R. Barusch, Industrial & Engineering Chemistry, Anal. Ed., vol. 14, 907 (1942) with the exceptions (1) there is a T and stopcock between the reaction flask (B) and the calibrated section of the buret (A) so that air may be removed and hydrogen admitted by alternate evacuation and filling and (2) there is a 25 ml. reservoir just below the calibrations of said section. The reaction flask employed is similar to that of Noller et al. except that in place of the side arm with cup it has a side arm fitted with a ground glass stopper. The stopper end (within the flask) is so made as to permit a sample cup placed thereon to drop to the bottom of the flask when the stopper handle is turned 90 degrees.

Remove the side arm of the reaction flask and weigh in 0.10±0.01 g. PtO catalyst. Add a glass-encased iron wire and wash the catalyst into the flask with 5 ml. acetic acid. Grease the upper half of the ground joint on the side arm and insert in flask. Weigh the sample of rosin acid (0.15–0.20 g.) to the nearest 0.0001 g. into a 9 x 15 mm. sample cup. If the sample is a powdered solid, moisten with a drop of acetic acid. Place the sample cup in the neck of the flask where it is supported by the end of the stopper. Connect the flask to the gas buret using a thin film of grease on the ground glass joint, evacuate the apparatus and fill the same with hydrogen. Repeat the evacuation and filling cycle four times. The final filling with hydrogen should almost completely fill the reservoir at the base of the buret. When this condition is reached, the flow of hydrogen into the buret is stopped by closing the proper stopcocks.

A magnetic stirrer is placed below the reaction flask and started. The speed is regulated so that stirring is just sufficiently vigorous to break the liquid surface. At this point reduction of the catalyst starts. When the catalyst is completely reduced to platinum black as evidenced by no further change in the mercury level (this requires about 1 hour), the mercury surfaces in the buret are leveled using the mercury reservoir. This condition of complete reduction is determined by reading the leveled mercury volume at 30-minute intervals until the volume is constant within 0.1 ml.

When complete reduction of the PtO has been achieved, record the gas volume, temperature, and barometric pressure. The gas volume at this point should not be more than 45 ml. Rotate the side arm so as to allow the sample cup to drop into the acetic acid solution. Permit hydrogenation to proceed for about 16 hours. Read the final gas volume, temperature, and pressure. Temperature is read to the nearest 0.1° C. and the pressure to the nearest 1 mm. Correct the initial and final gas volumes to standard conditions, first adding the volume of the uncalibrated system.

$$\frac{(\text{Corrected initial volume} - \text{corrected final volume})\ 0.00900}{\text{Grams of sample}} = \text{per cent } H_2 \text{ absorbed}$$

What we claim and desire to protect by Letters Patent is:

1. In the process of preparing highly saturated tall oil alcohols by the high pressure catalytic hydrogenolysis of a tall oil compound selected from the group consisting of tall oil acid and esters of tall oil acid with a lower aliphatic alcohol, the improvement which comprises subjecting the said tall oil compound to a preliminary pressure hydrogenation at a temperature of at least about 120° C. over an active hydrogenation catalyst until the said tall oil compound is at least about 10% saturated with hydrogen and removing the spent catalyst prior to hydrogenolysis of the said tall oil compound.

2. A process according to claim 1 in which the hydrogenation catalyst is Raney nickel.

3. A process according to claim 1 in which the hydrogenation catalyst is copper chromite.

4. In the process of preparing highly saturated tall oil alcohols by the high pressure catalytic hydrogenolysis of a tall oil compound selected from the group consisting of tall oil acid and esters of tall oil acid with a lower aliphatic alcohol, the improvement which comprises subjecting the said tall oil compound to a preliminary pressure hydrogenation at a temperature of between about 120° C. and about 300° C. and a pressure between 100 and 200 lb./sq. in. over an active hydrogenation catalyst until the said tall oil compound is at least about 10% saturated with hydrogen and removing the spent catalyst prior to the hydrogenolysis of the said tall oil compound.

5. A process according to claim 4 in which the hydrogenation catalyst is Raney nickel.

6. In the process of preparing highly saturated tall oil alcohols by the high pressure catalytic hydrogenolysis of a tall oil compound selected from the group consisting of tall oil acid and esters of tall oil acid with a lower aliphatic alcohol, the improvement which comprises subjecting the said tall oil compound to a preliminary pressure hydrogenation at a temperature of between about 120° C. and about 300° C. and at an elevated pressure over an active chromite catalyst until the said tall oil compound is at least about 10% saturated with hydrogen and removing the spent catalyst prior to the hydrogenolysis of the said tall oil compound.

7. A process according to claim 6 in which the chromite catalyst is copper chromite.

References Cited in the file of this patent

UNITED STATES PATENTS

| | | |
|---|---|---|
| 2,146,897 | Humphrey | Feb. 14, 1939 |
| 2,336,472 | Dressler | Dec. 14, 1943 |
| 2,358,235 | Lazier | Sept. 12, 1944 |
| 2,369,446 | Dressler | Feb. 13, 1945 |
| 2,392,952 | Schmidt | Jan. 15, 1946 |
| 2,413,009 | Taussky | Dec. 24, 1946 |